:::::::::::::::::::::::::::::::::::::::::::::::::::::::::::::::::::::::::::::::::::::::::::::::

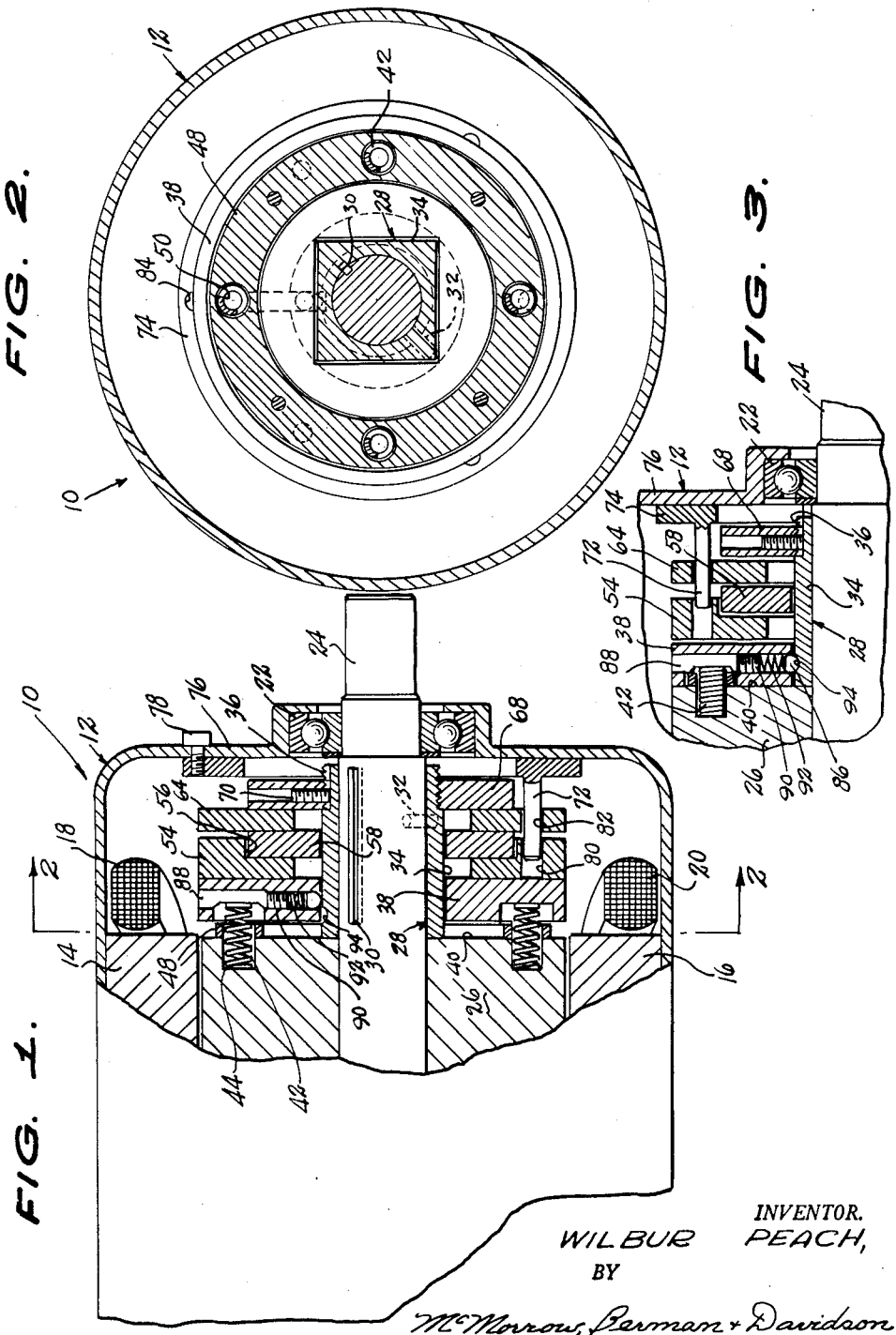

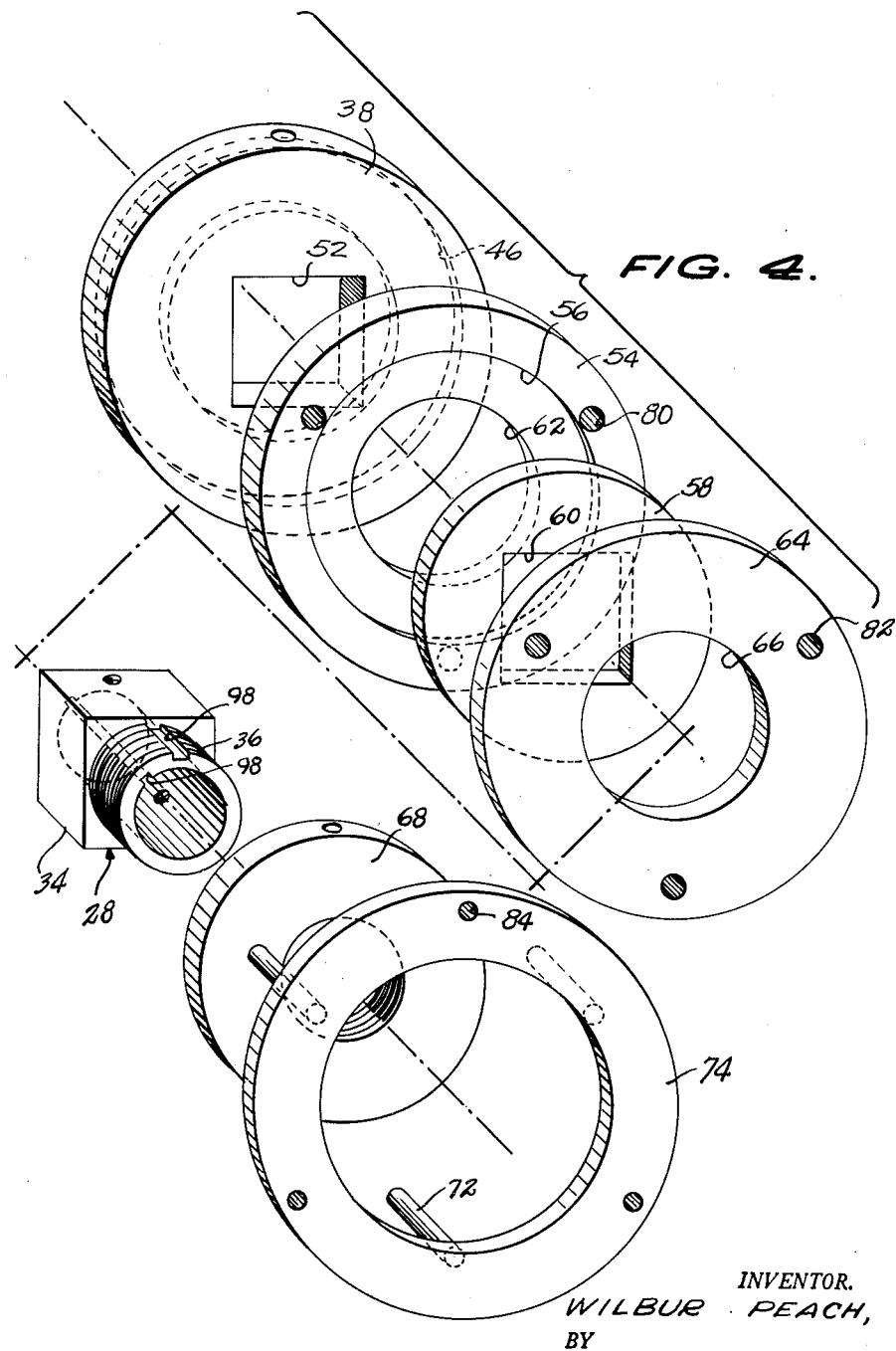

United States Patent Office 3,037,133
Patented May 29, 1962

3,037,133
MAGNETIC INDUCTION BRAKE
Wilbur Peach, 1345 W. Ray St., Indianapolis, Ind.
Filed Mar. 6, 1959, Ser. No. 797,648
5 Claims. (Cl. 310—77)

The present invention relates to a magnetic induction brake for an electric motor.

Presently in use are electric motors having brake mechanisms for stopping the motor upon cutting off of the current to the motor. Many of such brake mechanisms are actuated to the release position by the force of the magnetic flux of the field windings of the motor and are actuated by spring means to the braking position. Due to the phenomena of decay of magnetic flux in the motor as the latter reaches its top rotational speed, the spring means is required to exert only a relatively light pressure or force to actuate the brake mechanism to braking position, otherwise the pressure or force would overcome the force of the magnetic flux in the rotor at high speeds. The relatively light pressure or force exerted by such a spring means is generally insufficient to effect efficient braking action and the brake mechanism is deemed to be unsuitable for many applications.

An object of the present invention is to provide a magnetic induction brake for an electric motor having a spring means for actuating the mechanism to braking position, such spring means exerting a relatively light pressure or force but of such magnitude as to instantly and completely stop the rotor from rotating upon cutting off of the current to the motor.

Another object of the present invention is to provide a magnetic induction brake for an electric motor which has few component parts, one occupying relatively little space within the motor housing adjacent the end of the rotor and one which may be employed to electric motors of all sizes and having various loading characteristics.

A further object of the present invention is to provide a magnetic induction brake for an electric motor which is simple in structure, one sturdily constructed having long-life characteristics, one which is economically feasible, and one which is highly effective in action.

These and other objects and advantages of the present invention will be fully apparent from the following description when taken in conjunction with the annexed drawings, in which:

FIGURE 1 is a fragmentary view partially in section of one end of a motor housing, showing the magnetic induction brake of the present invention installed therein, the brake being in operative position;

FIGURE 2 is a view taken on the line 2—2 of FIGURE 1;

FIGURE 3 is a fragmentary view similar to FIGURE 1, showing the brake in inoperative position; and FIGURE 4 is an isometric exploded view of the components of the brake of the present invention, shown removed from the shaft of the motor.

Referring in greater detail to the drawings in which like numerals indicate like parts throughout the several views, the reference numeral 10 designates generally an electric motor having a housing 12, stator elements 14 and 16 secured to the inner wall of the housing 12 and extending thereabout, and field windings 18, 20, shown in cross section in FIGURE 1, extending about the stator elements 14 and 16, respectively.

Although only one end of the housing 12 is shown, it is to be understood that bearing assemblies 22 in the end portions of the housing 12 support the motor shaft 24 for rotation therein.

A magnetizable rotor 26 is fixedly mounted on the shaft 24 for rotation therewith.

On the portion of the shaft 24 within the housing 12 and contiguous to the rotor 26 is a hub member 28 fixedly circumposed about the shaft 24 and secured thereto by a conventional key 30, shown in end view in FIGURE 2. A set screw 32, shown in dotted lines in FIGURES 1 and 2, also secures the hub member 28 on the shaft 24.

The hub member 28 has a noncircular perimeter portion, in this case it is square in cross-sectional configuration, as shown most clearly in FIGURE 2. The square perimeter portion of the hub member 28 is designated by the reference numeral 34 and extends from the one end face of the hub member 28 contiguous to the rotor 26 to a point spaced from the other face of the hub member 28. The remaining part of the perimeter portion of the hub member 28 is circular and is provided with threads, as at 36 in FIGURE 1.

A disc member 38, fabricated of a magnetic material, is slidable on the square portion 34 of the member 28 from a position adjacent to and spaced from the end face 40 of the rotor 26 (FIGURE 1) to a position abutting the end face 40 of the rotor 26, as shown in FIGURE 3.

Spring means is interposed between and is operatively connected to the one face 40 of the rotor 26 and the disc member 38 for biasing the disc member 38 away from the rotor 26. Specifically, this spring means consists in a plurality of coil springs 42, each having the portion adjacent one end seated in a bore 44 provided in the end face 40 of the rotor 26. The other end of each spring 42 bears against the bottom of an annular recess 46 provided in the confronting face of the disc member 38, the recess 46 being conformably shaped to fit and receive therein end ring 48 mounted upon the face 40 of the rotor 26, such ring 48 being provided with apertures at spaced intervals through which extend the midportions of the springs 42, the apertures being seen most clearly in FIGURES 2 and 4, and designated by the reference numeral 50.

The disc member 38 has a square hole 52 permitting it to slide freely upon the square perimeter portion 34 of the hub member 28.

A first friction disc 54 is circumposed about and slidable on the square perimeter portion 34 of the hub member 28 and is contiguous to the disc member 38. The face of the first friction disc 54 remote from the disc member 38 is provided with an annular recess 56 of a diameter such as to loosely receive therein another or second friction disc 58. The recess 56 is of a depth less than the thickness of the friction disc 58 so that a portion of the friction disc 58 projects out of the recess 56, as shown most clearly in FIGURE 1. The friction disc 58 is provided with a square hole 60 of a size to loosely receive the square portion 34 of the hub member 28. The friction disc 54 is provided with a circular hole 62 of a size to permit rotation of the square portion 34 of the hub member 28 therein.

Another or third friction disc 64 is circumposed and slidable on the portion 34 of the hub member 28 and is positioned inwardly of and adjacent the terminating point of the portion 34 of the hub member 28. The friction disc 64 is provided at its center with a circular hole 66 of the same size as the hole 62 in the friction disc 54.

An abutment means, embodying a disc 68, is fixed on the portion of the hub member 28 having the threads 36 adjacent the portion 34. A set screw 70 detachably secures the disc 68 to the threaded portion of the hub member 28. The disc 68 is of a diameter substantially equal to the diameter of the friction disc 58, as shown most clearly in FIGURES 1 and 3.

Means is provided on the motor 10 engaging the friction discs 54 and 64 for holding them against rotation. Specifically, this holding means consists in a plurality of pins 72, here shown as three in number, projecting perpendicularly from one face of a ring 74 which is carried upon the inner face of the end wall 76 of the housing 12. Machine screws 78 secure the ring 74 to the housing 12 in a position concentrically disposed relative to the shaft 24. The pins 72 extend loosely through apertures 80 and 82 provided in the friction discs 54 and 64, respectively. The machine screws 78 are threadedly received into threaded bores 84 provided at spaced intervals in the ring 74 for securing the ring 74 to the housing 12.

Means is provided for releasably holding the disc member 38 in the position in which it abuts against the one end face 40 of the rotor 26. Specifically, this means consists in a detent ball 86 slidable in a bore 88 extending radially through the disc member 38 from the outside perimeter to the inner perimeter. The bore 88 is threaded and a set screw 90 adjustably compresses a spring 92 in the portion of the bore 88 between the set screw 90 and the ball 86. The adjacent part of the hub member 28 is provided with a shallow recess 94 receiving a peripheral portion of the ball 86 when the latter has been moved with the disc member 38 upon execution of movement of the disc member 38 to the position in abutting relation with respect to the end face 40 of the rotor 26.

The portion of the hub member 28 having threads 36 is provided with a groove 98 receiving the end portion of the set screw 70 when the latter is screwed down tight on the hub member 28 for holding the disc 68 in the proper position for abutment thereagainst the adjacent friction disc 64. The inner wall of the hub member 28 is also provided with a keyway 98 receiving the key 30 for securing the hub member 28 on the adjacent portion of the shaft 24.

In operation, when the windings 18, 20, of the motor 10 are energized by the application thereto of an electric current, the magnetic flux set up in the stator elements 14 and 16 and in the rotor 26 effects the attraction of the disc member 38 to the position in which it abuts against the face 40 of the rotor 26, compressing the springs 42. The detent ball 86 is moved with the disc member 38 to a position in registry with the recess 94 and under the action of the spring 92 is moved partially into the recess 94 in such a manner as to exert a holding force on the disc member 38 for movement away from the rotor 26. The compression of the spring 92 is adjusted by moving the set screw 90 inwardly or outwardly of the bore 88 so that the holding force of the detent ball 86 applied to the disc member 38 is such that when the magnetic flux in the windings 18 and 20 and rotor 26 decays, the holding force of the ball 86 is just enough to retain the disc member 38 in its position of abutment against the adjacent face of the rotor 26. Upon deenergization of the windings 18 and 20, the magnet flux ceases and the springs 42 force the disc member 38 away from the rotor 26 so that the face of the disc member 38 remote from the rotor 26 bears against the adjacent face of the friction disc 54, the bottom of the recess 56 bears against the adjacent face of the friction disc 58, the other face of the disc 58 bears against the adjacent face of the friction disc 64, and the other face of the friction disc 64 bears against the adjacent face of the disc 68. This brakes the shaft to a stop until the windings 18 and 20 are again reenergized.

The friction discs 54 and 64 constitute first and second friction discs having a third friction disc 56 positioned therebetween and engaged by the adjacent faces thereof.

It is to be understood that the friction discs 54, 58, and 64 may be increased to any desired number. Also, while it is shown that the pins 72 secure the friction discs 54 and 64 against rotation within the housing 12 and the friction disc 58 is mounted on the hub member 28 for rotation therewith, it is to be understood that other arrangements may be made and the discs 54 and 64 may be suitably connected to the shaft 24 and the other friction disc 58 connected to the housing 12, if desired.

While only a preferred form of the invention is shown and described, numerous changes and modifications may be made therein without departing from the spirit of the invention as set forth in the appended claims.

What is claimed is:

1. In an electric motor, a rotatable shaft, a magnetizable motor on said shaft, a hub member fixedly circumposed about said shaft and contiguous to said rotor, said hub member having a noncircular perimeter portion extending from the one face adjacent said rotor to a point spaced from the other face, a disc member of magnetic material slidable on the noncircular portion of said hub member into and out of abutting relation with respect to said one face of said rotor, detent means carried by said disc member and releasably engageable with means provided on said hub member for holding the disc member when in abutting relation with respect to said one face of said rotor, at least two friction discs separated by another disc circumposed about and slidable on the noncircular portion of said hub member, and means on said motor and engaging said two friction discs for holding the latter discs against rotation.

2. In an electric motor, a rotatable shaft, a magnetizable rotor on said shaft, a hub member fixedly circumposed about said shaft and contiguous to said rotor, said hub member having a noncircular perimeter portion extending from the one face adjacent said rotor to a point spaced from the other face, a disc member of magnetic material slidable on the noncircular portion of said hub member into and out of abutting relation with respect to said one face of said rotor, detent means carried by said disc member and releasably engageable with means provided on said hub member for holding the disc member when in abutting relation with respect to said one face of said rotor, spring means interposed between and operatively connected to said one face of said rotor and said disc member for biasing the disc member away from said rotor, at least two friction discs separated by another disc circumposed about and slidable on the noncircular portion of said hub member, and means on said motor and engaging said two friction discs for holding the latter discs against rotation.

3. In an electric motor, a rotatable shaft, a magnetizable rotor on said shaft, a hub member fixedly circumposed about said shaft and contiguous to said rotor, said hub member having a noncircular perimeter portion extending from the one face adjacent said rotor to a point spaced from the other face, a disc member of magnetic material slidable on the noncircular portion of said hub member into and out of abutting relation with respect to said one face of said rotor, detent means carried by said disc member and releasably engageable with means provided on said hub member for holding the disc member when in abutting relation with respect to said one face of said rotor, at least two friction discs separated by another disc circumposed about and slidable on the noncircular portion of said hub member, abutment means fixed on said hub member adjacent said noncircular portion, and means on said motor and engaging said two friction discs for holding the latter discs against rotation.

4. In an electric motor, a rotatable shaft, a magnetizable rotor on said shaft, a hub member fixedly circumposed about said shaft and contiguous to said rotor, said hub member having a noncircular perimeter portion extending from the one face adjacent said rotor to a point spaced from the other face, a disc member of magnetic material slidable on the noncircular portion of said hub member into and out of abutting relation with respect to said one face of said rotor, detent means carried by said disc member and releasably engageable with means provided on said hub member for holding the disc member when in abutting relation with respect to said one face of said rotor, spring means interposed between and operatively connected to said one face of said rotor and said disc member for biasing the disc member away from said rotor, at least two friction discs separated by another disc circumposed about and slidable on the noncircular portion of said hub member, abutment means fixed on said hub member adjacent said noncircular portion, and means on said motor and engaging said two friction discs for holding the latter discs against rotation.

5. In an electric motor, a rotatable shaft, a magnetizable rotor on said shaft, a hub member fixedly circumposed about said shaft and contiguous to said rotor, said hub member having a noncircular perimeter portion extending from the one face adjacent said rotor to a point spaced from the other face, a disc member of magnetic material slidable on the noncircular portion of said hub member into and out of abutting relation with respect to said rotor one face, a spring-biased ball detent carried by said disc member and releasably engageable with a recess provided on said hub member for holding the disc member when in abutting relation with respect to said one face of said rotor, spring means interposed between and operatively connected to one face of said rotor and said disc member for biasing the disc member away from said rotor, a first friction disc circumposed about and slidable on the noncircular portion of said hub member and contiguous to said disc member, a second friction disc circumposed about and slidable on the noncircular portion of said hub member and inwardly of and adjacent the terminating point of the noncircular portion of said hub member, a third friction disc circumposed about and slidable on the part of said noncircular portion between said first and second discs, abutment means fixed on said hub member adjacent said noncircular portion, and means on said motor and engaging said first and second discs for holding the latter discs against rotation, said abutment means being frictionally engageable by said second disc responsive to axial force exerted on said disc member by said spring means, and said disc member being magnetically retracted from said first disc toward said rotor responsive to energization of said motor.

References Cited in the file of this patent

UNITED STATES PATENTS

| | | |
|---|---|---|
| 2,218,168 | Hedgpeth | Oct. 15, 1940 |
| 2,482,840 | Collins et al. | Sept. 27, 1949 |
| 2,628,321 | Anderson | Feb. 10, 1953 |
| 2,809,309 | Evans | Oct. 8, 1957 |